United States Patent Office 2,799,614
Patented July 16, 1957

2,799,614

1,2,3,4,9,9 - HEXACHLORO - 1,4,4a,5,6,7,8,8a - OCTA-HYDRO-5-ALKOXY - 1,4 - METHANONAPHTHA-LENES AND USE THEREOF IN CONTROLLING PESTIOLOGICALLY ACTIVE ORGANISMS

Victor Mark, Evanston, Ill., assignor to Universal Oil Products Company, Des Plaines, Ill., a corporation of Delaware No Drawing. Application December 10, 1954,
Serial No. 474,610

10 Claims. (Cl. 167—30)

This invention relates to polycyclic organic compounds containing various substituents in the structure, said compounds being useful as chemical intermediates and as a toxicant ingredient of insecticidal compositions.

More specifically this invention relates to polycyclic organic compounds formed by the process which involves the condensation of a substituted cyclic olefinic compound with a polyhalocycloalkadiene.

An object of this invention is to provide substituted polycyclic compounds which are useful as insecticides.

A further object of this invention is to provide halogen-substituted tricyclic compounds which contain nuclearly-substituted side chains, said compounds being useful as a means of controlling pestiologically active organisms.

In one embodiment the present invention concerns a process for preparing a tricyclic compound by reacting a polyhalocycloalkadiene with a compound having the formula:

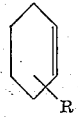

in which R is selected from the group consisting of alkoxy, haloalkoxy, alkenoxy, aralkoxy, alkaroxy, aroxy, haloaroxy, alkylthio, haloalkylthio, alkenylthio, aralkylthio, alkarylthio, arylthio and haloarylithio radicals.

Another embodiment of this invention resides in a method of controlling pestiologically active organisms which comprises treating said organisms with a compound having the general formula:

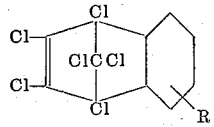

in which R is selected from the group consisting of alkoxy, haloalkoxy, alkenoxy, aralkoxy, alkaroxy, aroxy, haloaroxy, alkylthio, haloalkylthio, alkenylthio, aralkylthio, alkarylthio, arylthio and haloarylthio radicals.

A specific embodiment of this invention resides in a process of reacting a substituted bicyclic compound with hexachlorocyclopentadiene, and recovering the resultant tricyclic compound.

A more specific embodiment of this invention is found in a process for reacting hexachlorocyclopentadiene with 3-ethoxycyclohexene, and recovering the resultant 1,2,3,4,9,9 - hexachloro - 1,4,4a,5,6,7,8,8a - octahydro - 5-ethoxy-1,4-methanonaphthalene.

Another specific embodiment of this invention resides in a method of controlling pestiologically active organisms by treating said organisms with a compound comprising 1,2,3,4,9,9 - hexachloro - 1,4,4a,5,6,7,8,8a - octahydro - 5-ethoxy-1,4-methanonaphthalene.

Yet another specific embodiment of this invention resides in a new composition of matter comprising 1,2,3,- 4,9,9 - hexachloro - 1,4,4a,5,6,7,8,8a - octahydro - 5-ethoxy-1,4-methanonaphthalene.

Other objects and embodiments concerning alternative cyclic olefinic compounds and alternative polyhalocycloalkadienes containing at least one pair of conjugated olefinic linkages will be referred to in the following further detailed description of this invention.

As hereinbefore indicated the products of this invention are formed by reacting a polyhalocycloalkadiene such as dichlorocyclopentadiene, dibromocyclopentadiene, trichlorocyclopentadiene, tetrachlorocyclopentadiene, pentachlorocyclopentadiene, hexachlorocyclopentadiene, tribromocyclopentadiene, tetrabromocyclopentadiene, hexabromocyclopentadiene, difluorocyclopentadiene, trifluorocyclopentadiene, tetrafluorocyclopentadiene, pentafluorocyclopentadiene, hexafluorocyclopentadiene, etc., with a compound having the formula:

in which R is a substituent of the character hereinbefore designated.

Substituted mono-olefinic cyclic compounds capable of reacting, in the present condensation, with the polyhalocycloalkadiene reactant include alkyl-substituted cyclic ethers such as 3-methoxycyclohexene-1, 3-ethoxycyclohexene-1, 3-propoxycyclohexene-1, 3-butoxycyclohexene-1, 4-methoxycyclohexene-1, 4-propoxycyclohexene-1, etc.; haloalkyl-substituted cyclic ethers such as 3-chloromethoxycyclohexene-1, 3-dichloromethoxycyclohexene-1, 3-trichloromethoxycyclohexene - 1, 3 - bromomethoxycyclohexene - 1, 3 - dibromomethoxycyclohexene - 1, 3 - fluoromethoxycyclohexene-1, 3-difluoromethoxycyclohexene-1, 3-α-chloroethoxycyclohexene - 1, 3 - α,α - dichloroethoxycyclohexene-1, 3-β-chloroethoxycyclohexene-1, 3-α,β-dichloroethoxycyclohexene-1, 3-β,β - dichloroethoxycyclohexene-1, 3-α-fluoroethoxycyclohexene-1, 3-α-bromoethoxycyclohexene-1, 3 - α,β - dibromoethoxycyclohexene-1, 3-α,β-difluoroethoxycyclohexene-1, 3-β,β-dibromoethoxycyclohexene-1, 3-β,β-difluoroethoxycyclohexene-1, etc., 4-chloromethoxycyclohexene-1, 4-trichloromethoxycyclohexene-1, 4 - dibromoethoxycyclohexene - 1, 4 - difluoromethoxycyclohexene - 1, 4 - β,β - dichloroethoxycyclohexene-1, 4-α,β - dichloroethoxycyclohexene-1, 4-β - fluoroethoxycyclohexene-1, 4-β,β-dibromoethoxycyclohexene-1, 4α,β-dibromoethoxycyclohexene-1, etc.; alkenyl-substituted cyclic ethers such as 3-vinyloxycyclohexene-1, 3-propenoxycyclohexene-1, 4-vinyloxycyclohexene-1, etc.; haloaryl-substituted cyclic ethers such as the 3-chlorophenoxycyclohexenes-1, the 3-dichlorophenoxycyclohexenes-1, the 3-trichlorophenoxycyclohexenes-1, the 4-chlorophenoxycyclohexenes - 1, the 4 - trichlorophenoxycyclohexenes-1, etc.; alkyl-substituted cyclic thioethers such as 3-methylthiocyclohexene-1, 3-ethylthiocyclohexene-1, 3 - propylthiocyclohexene-1, 3 - butylthiocyclohexene-1, etc.; haloalkyl-substituted cyclic thioethers such as 3-chloromethylthiocyclohexene-1, 3-dichloromethylthiocyclohexene - 1, 3 - trichloromethylthiocyclohexene - 1, 3-bromomethylthiocyclohexene - 1, 3 - dibromomethylthiocyclohexene-1, 3 - fluoromethylthiocyclohexene - 1, 3 - difluoromethylthiocyclohexene-1, 3-α-chloroethylthiocyclohexene - 1, 3 - α,α - dichloroethylthiocyclohexene - 1, 3-β-chloroethylthiocyclohexene - 1, 3 - α,β - dichloroethylthiocyclohexene-1, 3-β,β-dichloroethylthiocyclohexene-1, 3-α-fluoroethylthiocyclohexene-1, 3 - α-bromoethylthiocyclohexene-1, 3-α,α-dibromoethylthiocyclohexene-1, 3-α,α-difluoroethylthiocyclohexene - 1, 3 - α,β - dibromoethylthiocyclohexene-1, 3-α,β-difluoroethylthiocyclohexene-1, etc.; alkenyl-substituted cyclic thioethers such as 3-vinylthiocyclohexene-1, 3-propenylthiocyclohexene-1, etc.; haloaryl substituted cyclic thioethers such as the 3-chlorophenylthiocyclohexenes-1, the 3-dichlorophenylthiocyclohexenes-1, the 3-trichlorophenylthiocyclohexenes-1, etc. It is understood that the above polyhalocycloalkadienes and substituted cyclic ethers and thioethers are only representative of the class of compounds which may be used in the process of the present invention and that said process is not necessarily limited thereto.

The volatility of the present product is usually dependent upon its molecular weight and when a product having low volatility is especially desired in a particular application, such as a high degree of retentivity or activity on the surface to which the pesticide is applied, advantage may be taken of the fact that the products of the present invention having a high molecular weight also possess relatively higher boiling points than do the products having low molecular weight, and thus may be the preferred reactants for the production of such compositions.

The present tricyclic nuclearly substituted compounds are prepared by the thermal condensation of the reactant hereinbefore characterized as a polyhalocyclic-alkadiene containing at least one pair of conjugated olefinic linkages with the reactant which may be referred to as a substituted cyclo-olefin, preferably at a pressure sufficient to maintain at least one of the reactants in substantially liquid phase. Although the use of approximately equimolecular ratios of the reactants generally results in a substantial yield of the desired condensation product, it is usually preferred to maintain a stoichiometric excess of the diene component in the reaction mixture of from about 1.5 to 1 to about 10 to 1 moles per mole of the cyclic olefin reactant in order to consume the latter component substantially to completion during the reaction. In addition, the excess of diene reactant provides an effective diluent of the reaction mixture, enabling the rate of the resultant exothermic reaction to be controlled within desirable limits. In thus substantially removing the cyclic alkene component from the reaction mixture by virtue of its substantially complete condensation with the diene the subsequent problem of separating the product from the reaction mixture is simplified, since the excess diene (or dimers thereof), usually the components of the reaction mixture having the lowest boiling points, may be removed therefrom merely by distilling the same from the mixture, leaving a residue comprising the desired insecticidal condensation product. The latter residue may be thereafter purified, for example, by fractional distillation, crystallization, extraction or by other means well known in the art or utilized directly without further treatment for the preparation of an insecticidal composition. The product may be additionally treated if so desired, for example, by reaction with a metal to effect dehalogenation or with an alkaline material to effect dehydrohalogenation. In addition, the compounds may also be halogenated if so desired to introduce additional halogen substituents into the structure.

The condensation reaction provided herein, generally characterized as one of the Diels-Alder type, is effected at a temperature of from about 30° to about 180° C. or more, preferably at a temperature of from about 50° C. to about 150° C. Use of superatmospheric pressures, generally in excess of about 2 atmospheres and preferably from about 10 to about 100 atmospheres is advantageous in providing an essentially liquid phase reaction mixture. In order to provide such pressure within the reaction vessel, a gas such as nitrogen, carbon dioxide, or other inert gas may be charged into the reaction vessel at the desired pressure and the reaction mixture heated at such pressure until the optimum degree of condensation has occurred.

The physical properties of the present tricyclic condensation products and the effects they have on entomological forms of life make them particularly desirable as insecticides and insect repellants, the compounds having many of the features desired of materials for this purpose. They are, for example, toxic to insects which are destructive of plant life and materials normally subject to insect infestation, their toxic effects being manifested by contact of the poison with the insect. The insecticides comprising the present compound are thus effective against chewing as well as sucking types of insects. The compounds are sufficiently volatile so that when applied to plant life intended for subsequent human consumption, the plants when harvested and after allowing a reasonable time for evaporation of the applied insecticide therefrom retain none of the toxicant to prevent use of the plant for consumption as food. On the other hand, the compounds are of sufficiently limited volatility to be retained on the insect for the time required to accomplish the toxic effects of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, petroleum, etc.; a wax, such as paraffin wax, beeswax, etc.; a high molecular weight alcohol or ether such as myricyl alcohol, dibutyl ether, etc.; or they may be emulsified with water by the addition of an emulsifying agent, such as a surface active agent, to the mixture of components. The latter solvents and dispersants may also be employed for the specific purpose of reducing the concentration of insecticide to the desired level in a specific insecticide formulation. The particular formulation of active components in combination with the solvent or dispersant will depend upon its application. Compositions containing as high as 20% of active component may be preferred, in some instances where deep penetration of the insecticide is desired, as in the treatment of fibrous material, such as wood, for extinction of a particular infestation, for example, wood termites. For other purposes the required concentration of active components in the formulation may be as low as 0.1%, as for example, in the treatment of fabrics for destroying moth larvae. In utilizing the present insecticidal compounds against most insects, a composition containing from about 0.1% to about 5% by weight of the active component is highly effective. The choice of the most desirable solvent or dispersant further depends upon the method utilized to apply the insecticidal composition to the infested article. For example, a low molecular weight, normally gaseous carrying agent for the active insecticidal component, such as propane, butane, the Freons, etc., may be compressed and liquefied into a small bomb containing the insecticide. Upon release of pressure from the bomb, the liquefied carrier vaporizes and suspends a quantity of the active component therein, thus providing a convenient spraying method of applying the insecticide. The active component may also be dissolved in a liquid carrier, such as kerosene, an alcohol, ester, ketone, etc. and the resulting solution atomized by a suitable spraying device.

The process of the present invention may be effected in any suitable manner and may comprise either a batch or continuous type operation. When a batch type operation is used, a quantity of the reactants, namely, the polyhalocyclic alkadiene containing at least one pair of conjugated olefinic linkages and the substituted cyclic olefin are placed in an appropriate condensation apparatus containing mixing and heating means. The reaction vessel is heated to the desired temperature and maintained at such temperature for a predetermined period of time, usually not over 10 hours. At the end of this time, the reaction vessel and the contents thereof are cooled to room temperature and the reaction product is separated by conventional means, such as fractional distillation, crystallization, etc.

The products of this invention may also be prepared by a continuous process wherein the reactants are continuously charged in a reaction vessel maintained at the proper operating conditions of temperature and pressure and a product stream is continuously withdrawn from the reactor. The withdrawn condensation product is separated from unreacted starting materials and/or unwanted side reaction products which may have formed, and purified by conventional means, while the unreacted compounds are recycled for further use as a portion of the feed material.

Examples of tricyclic compounds comprising new compositions of matter which may be prepared according to the reaction of this invention include 1,2,3,4,9,9-hexachloro-1,4,4a,5,6,7,8,8a-octahydro - 5 - ethoxy - 1,4 - methanonaphthalene, 1,2,3,4,9,9-hexachloro-1,4,4a,5,6,7,8,8a-octahydro-5-methoxy-1,4-methanonaphthalene, 1,2,3,4,9,9-hexachloro-1,4,4a,5,6,7,8,8a-octahydro - 5 - propoxy-1,4-methanonaphthalene, 1,2,3,4,9,9-hexachloro-1,4,4a,5,6,7,8,8a-octahydro-5-butoxy-1,4-methanonaphthalene, 1,2,3,4,9,9 - hexachloro-1,4,4a,5,6,7,8,8a-octahydro-5-chloromethoxy-1,4-methanonaphthalene, 1,2,3,4,9,9-hexachloro-1,4,4a,5,6,7,8,8a - octahydro-5-dichloromethoxy-1,4-methanonaphthalene, 1,2,3,4,9,9-hexachloro-1,4,4a,5,6,7,8,8a-octahydro-5-trichloromethoxy-1,4-methanonaphthalene, 1,2,3,4,9,9-hexachloro - 1,4,4a,5,6,7,8,8a-octahydro - 5 - bromomethoxy-1,4-methanonaphthalene, 1,2,3,4,9,9-hexachloro-1,4,4a,5,6,7,8,8a - octahydro-5-dibromomethoxy-1,4-methanonaphthalene, 1,2,3,4,9,9-hexachloro-1,4,4a,5,6,7,8,8a-octahydro-5-fluoromethoxy-1,4-methanonaphthalene, 1,2,3,4,9,9 - hexachloro - 1,4,4a,5,6,7,8,8a - octahydro - 5 - α-chloroethoxy-1,4-methanonaphthalene, 1,2,3,4,9,9 - hexachloro - 1,4,4a,5,6,7,8,8a - octahydro-5-α,α-dichloroethoxy-1,4-methanonaphthalene, 1,2,3,4,9,9-hexachloro-1,4,4a,5,6,7,8,8a-octahydro-5-β-chloroethoxy - 1,4 - methanonaphthalene, 1,2,3,4,9,9 - hexachloro-1,4,4a,5,6,7,8,8a-octahydro-5-α-fluoroethoxy-1,4-methanonaphthalene, 1,2,3,4,9,9-hexachloro-1,4,4a,5,6,7,8,8a-octahydro-5-α,β-dibromoethoxy-1,4-methanonaphthalene, 1,2,3,4,9,9 - hexachloro-1,4,4a,5,6,7,8,8a-octahydro-5-α,β-difluoroethoxy-1,4-methanonaphthalene, 1,2,3,4,9,9-hexachloro-1,4,4a,5,6,7,8,8a-octahydro - 5 - phenoxy - 1,4-methanonaphthalene, 1,2,3,4,9,9-hexachloro - 1,4,4a,5,6,7,8,8a-octahydro-5-propenoxy-1,4-methanonaphthalene, 1,2,3,4,9,9-hexachloro-1,4,4a,5,6,7,8,8a-octahydro-5-chlorophenoxy-1,4-methanonaphthalene, 1,2,3,4,9,9 - hexachloro - 1,4,4a,5,6,7,8,8a -octahydro-5-dichlorophenoxy-1,4-methanonaphthalene, 1,2,3,4,9,9-hexachloro - 1,4,4a,5,6,7,8,8a-octahydro-5,5-trichlorophenoxy-1,4 - methanonaphthalene, 1,2,3,4,9,9-hexachloro-1,4,4a,5,6,7,8,8a - octahydro-6-ethoxy-1,4-methanonaphthalene, 1,2,3,4,9,9 - hexachloro-1,4,4a,5,6,7,8,8a-octahydro-6-methoxy-1,4-methanonaphthalene, 1,2,3,4,5,9,9-hexachloro-1,4,4a,5,6,7,8,8a - octahydro-6-propoxy-1,4-methanonaphthalene, 1,2,3,4,9,9-hexachloro-1,4,4a,5,6,7,8,8a-octahydro-6-butoxy - 1,4-methanonaphthalene, 1,2,3,4,9,9-hexachloro-1,4,4a,5,6,7,8,8a-octahydro - 6 - chloromethoxy-1,4-methanonapthalene, 1,2,3,4,9,9-hexachloro-1,4,4a,5,6,7,8,8a-octahydro-6-dichloromethoxy-1,4-methanonaphthalene, 1,2,3,4,9,9 - hexachloro - 1,4,4a,5,6,7,8,8a - octahydro-6-tri - chloromethoxy-1,4-methanonaphthalene, 1,2,3,4,9,9-hexachloro - 1,4,4a,5,6,7,8,8a - octahydro-6-bromonethoxy-1,4-methanonaphthalene, 1,2,3,4,9,9-hexachloro - 1,4,4a,5,6,7,8,8a - octahydro-6-dibromomethoxy-1,4-methanonaphthalene, 1,2,3,4,9,9-hexachloro-1,4,4a,5,6,7,8,8a-octahydro - 6 - fluoromethoxy - 1,4 - methanonaphthalene, 1,2,3,4,9,9-hexachloro -1,4,4a,5,6,7,8,8a-octahydro-6-α-chloroethoxy-1,4-methanonaphthalene, 1,2,3,4,9,9-hexachloro-1,4,4a,5,-6,7,8,8a - octahydro-6 - α,α - dichloroethoxy-1,4-methanonaphthalene, 1,2,3,4,9,9-hexachloro-1,4,4a,5,6,7,8,8a-octahydro-6-β-chloroethoxy - 1,4 - methanonaphthalene, 1,2,3,4,9,9 - hexachloro - 1,4,4a,5,6,7,8,8a-octahydro-6-α-fluoroethoxy -1,4- methanonaphthalene, 1,2,3,4,9,9-hexachloro-1,4,4a,5,6,7,8,8a - octahydro - 6 - α,β - dibromoethoxy-1,4-methanonaphthalene, 1,2,3,4,9,9-hexachloro - 1,4,4a,5,6,7,8,8a-octahydro-6-α,β-difluoroethoxy-1,4-methanonaphthalene, 1,2,3,4,9,9-hexachloro-1,4,4a,5,6,7,8,8a-octahydro-6-phenoxy-1,4-methanonaphthalene, 1,2,3,4,9,9-hexachloro-1,4,4a,5,6,7,8,8a - octahydro - 6 - propenoxy-1,4-methanonaphthalene, 1,2,3,4,9,9-hexachloro-1,4,4a,5,6,7,8,8a-octahydro-6-chlorophenoxy-1,4-methanonaphthalene, 1,2,3,4,9,9-hexachloro-1,4,4a,5,6,7,8,8a-octahydro-6-dichlorophenoxy-1,4-methanonaphthalene, 1,2,3,4,9,9-hexachloro-1,4,4a,5,6,7,8,8a - octahydro - 6 - trichlorophenoxy-1,4-methanonaphthalene, etc.

The present invention is further illustrated with respect to specific embodiments thereof in the following examples which, however, are not intended to limit the generally broad scope of the present invention in strict accordance therewith.

EXAMPLE I

Equimolar portions of hexachlorocyclopentadiene and 3-ethoxycyclohexene-1 were placed in a tube which was thereafter sealed and heated to a temperature of approximately 160° C. for a period of about 8 hours. At the end of this time, the tube and the contents thereof were cooled to room temperature, broken, and the reaction products therein subjected to fractional distillation under reduced pressure. The fraction having a boiling point of 135–141° C. at 0.25 mm. pressure, consisting of 1,2,3,4,9,9-hexachloro - 1,4,4a,5,6,7,8,8a - octahydro - 5 - ethoxy-1,4-methanonaphthalene was separated therefrom.

EXAMPLE II 1,2,3,4,9,9 - hexachloro - 1,4,4a,5,6,7,8,8a - octahydro-5-ethoxy-1,4-methanonaphthalene prepared according to the process set forth in Example I above, was tested to show the pesticidal activity of the compound using houseflies, pea aphids and mites as test insects. The results of these tests are set forth in Table I below.

*Table I*

| Houseflies—percent dead, 24 hours | | Pea Aphids—percent dead, 24 hours | | Mites—percent dead, 24 hours | |
|---|---|---|---|---|---|
| 1% dil. | 0.1% dil. | 1% dil. | 0.1% dil. | 1% dil. | 0.1% dil. |
| 100 | 60 | 100 | 0 | 100 | 0 |

I claim as my invention:

1. A method of controlling pestiologically active organisms which comprises treating said organisms with a compound having the general formula:

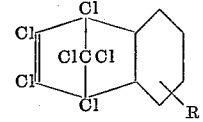

in which R is an alkoxy group containing from 1 to 4 carbon atoms.

2. A method of controlling pestiologically active organisms which comprises treating said organisms with 1,2,3,4,9,9 - hexachloro - 1,4,4a,5,6,7,8,8a - octahydro-5-ethoxy-1,4-methanonaphthalene.

3. A method of controlling pestiologically active organisms which comprises treating said organisms with 1,2,3,4,9,9 - hexachloro - 1,4,4a,5,6,7,8,8a - octahydro-5-β,β-dichloroethoxy-1,4-methanonaphthalene.

4. A method of controlling pestiologically active organisms which comprises treating said organisms with 1,2,3,4,9,9 - hexachloro - 1,4,4a,5,6,7,8,8a - octahydro-5-methoxy-1,4-methanonaphthalene.

5. A method of controlling pestiologically active organisms which comprises treating said organisms with 1,2,3,4,9,9 - hexachloro - 1,4,4a,5,6,7,8,8a -octahydro-5-propoxy-1,4-methanonaphthalene.

6. A compound having the general formula:

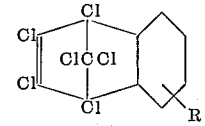

in which R is an alkoxy group containing from 1 to 4 carbon atoms.

7. 1,2,3,4,9,9-hexachloro-1,4,4a,5,6,7,8,8a-octahydro-5-ethoxy-1,4-methanonaphthalene.
8. 1,2,3,4,9,9-hexachloro-1,4,4a,5,6,7,8,8a-octahydro-5-β,β-dichloroethoxy-1,4-methanonaphthalene.
9. 1,2,3,4,9,9-hexachloro-1,4,4a,5,6,7,8,8a-octahydro-5-methoxy-1,4-methanonaphthalene.
10. 1,2,3,4,9,9-hexachloro-1,4,4a,5,6,7,8,8a-octahydro-5-propoxy-1,4-methanonaphthalene.

References Cited in the file of this patent
UNITED STATES PATENTS
2,635,979  Lidov _____ Apr. 21, 1953